United States Patent [19]

Wolff et al.

[11] 4,210,481

[45] Jul. 1, 1980

[54] LABELING MACHINES

[75] Inventors: Edwin K. Wolff, Stockholm; Alfred F. Schwenzer, Totowa, both of N.J.

[73] Assignee: NJM, Inc., Hoboken, N.J.

[21] Appl. No.: 960,709

[22] Filed: Nov. 14, 1978

[51] Int. Cl.$^{2}$ .............................................. B32B 1/00

[52] U.S. Cl. .................................... 156/357; 101/247; 156/384; 156/571

[58] Field of Search ........ 156/350, 351, 354, 356–357, 156/362–364, 566, 568, 571–572, 384, 387; 101/233–235, 247

[56] References Cited

U.S. PATENT DOCUMENTS

| | | | |
|---|---|---|---|
| 2,391,694 | 12/1945 | Everett | 156/357 |
| 2,703,660 | 3/1955 | VonHofe et al. | 156/384 X |
| 3,537,934 | 11/1970 | Munch | 186/571 X |

FOREIGN PATENT DOCUMENTS

| | | | |
|---|---|---|---|
| 809463 | 2/1959 | United Kingdom | 156/387 |

*Primary Examiner*—David A. Simmons
*Attorney, Agent, or Firm*—John J. Hart

[57] ABSTRACT

The labeling machine comprises means for successively depositing separate labels with their face sides outwardly on a continuously rotating suction drum, means for imprinting the labels while on the drum comprising a printing cylinder rotating about a first axis at a peripheral speed equal to that of the drum, means supporting the printing cylinder for translatory movement relative to the drum about a second axis, means for moving the supporting means about the second axis to shift the printing cylinder relative to the drum, and vacuum operated means in commincation with the suction in the drum and operable to actuate the moving means to withdraw the printing cylinder from the drum when the drum does not carry a label to be printed on the next printing cycle of the cylinder. The printing means are of a unitary construction to be installed as a unit in the labeling machine. The printed labels are delivered to an oppositely rotatable drum to be adhesively activated on their back sides. The labeling machine is provided with means for verifying the correctness of the labels just prior to being imprinted and with means for checking whether the imprint has been made on the labels.

11 Claims, 6 Drawing Figures

LABELING MACHINES

THE INVENTION

This invention relates to labeling machines and, more particularly to the mechanisms in such machines for imprinting on the label indicia such as code numbers, batch numbers, expiration dates, etc.

In those labeling machines employing individually cut and stacked labels for application to the articles being labeled, there is usually provided a drum or turret adapted to remove a label directly from a stack of such labels, to carry the label through an activation zone where the back surface of the label is made adhesive, to a position in given relationship with a moving article, such as a product container, and to apply the label to the article so that it adheres to a surface of the same. Since the labels are made adhesive while on the drum and are applied to the articles directly from the drum, it is necessary that the labels in their transfer from the hopper to the drum or turret be deposited on the latter with their back sides or surfaces outermost. It is therefore impossible in such machines to imprint the aforesaid indicia on the face side of the labels in their travels from the hopper to their application to the articles.

It has been found unsatisfactory to imprint the labels after they have been applied to the articles because of the distortions created on the surfaces of such applied labels by the uneven surfaces of the articles to which the labels are applied. As a result of such distortions, characters of the code being printed may not appear on a label. Should such imprinting of the applied labels be made in the labeling machine while the articles are moving therethrough, there is the additional likelihood of the printing being blurred.

Prior to this time, therefore, when a good quality of imprint is desired, such imprinting of the individually cut labels had to be done in a separate operation before being supplied to the labeling machine hopper. In performing such operation, the required labels had to be unwrapped, stacked in a code imprinting machine, imprinted with the desired information, restacked, and wrapped again for delivery to the location of the labeling machine. This practice which requires extra personnel, substantially increases the cost of cut labels which may be further heightened by other factors resulting from such practice. Thus, in order to assure an adequate supply of the coded labels, it is the usual practice to over run and imprint more labels than is actually needed by the product manufacturer. Of necessity, the extra labels supplied to the manufacturer must be destroyed. Further, some of the labels passing through the code imprinting machine may not receive a code due to the likelihood of the label feed in such machine feeding two labels simultaneously, in which case the imprint would appear on only one label. Also, labels are sometimes rendered unusable by being torn, wrinkled, or imprinted in the wrong area when passing through this extra operation of "off line" imprinting.

It is known that some labeling machines of the type which use a continuous strip or web of labels have been equipped with code imprinters. In such labelers, it is necessary that the labels be imprinted while in the web form and before such imprinted labels are severed from the web for application to the packages. In such machines therefore, the imprinted labels remaining in the web when the package labeling run is ended, are not used and must be destroyed.

It is the principal object of the present invention to provide a high speed labeling machine with an imprinter that can imprint indicia on the face of cut labels which are either fed from a stack or cut from a web in the labeling machine prior to such imprinting operation, as the cut labels are fed to the place of application to articles.

It is another object of the invention to provide a labeling machine having means for verifying the correctness of a cut label just prior to the imprinting of indicia thereon.

A further object of the invention is to provide a labeling machine with an imprinter capable of imprinting individual, cut labels and means for checking whether the imprint has been made on the labels.

Other objects of the invention, as well as the advantages and novel features thereof will become apparent from a perusal of the following description when read in connection with the accompanying drawings, in which FIG. 1 is a diagrammatic plan view of a labeling machine built in accordance with the invention;

Figure 1:
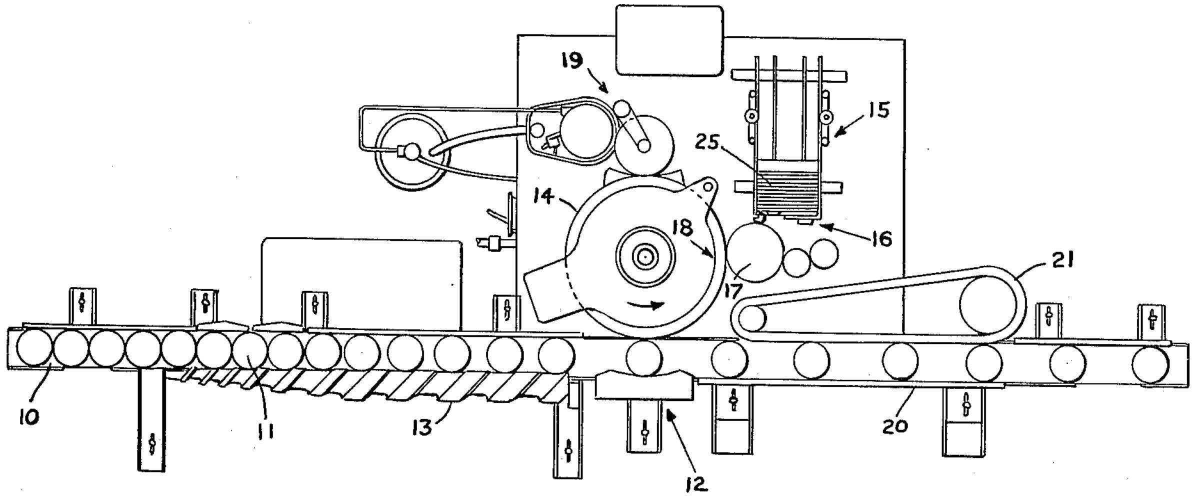

The machine depicted in FIG. 1 of the drawings includes a conveyor 10 which advances the articles to be labeled, such as the bottles 11, in a single file to the right, as viewed in such figure, to and past a station 12 at which labels are applied to the bottles. In their travel towards the label applying station 12, the bottles 11 are spaced apart a predetermined distance by a feed screw 13 mounted for rotatable movement about a horizontal axis and provided with a helically-shaped article engaging channel. At station 12, the path of travel of the bottles on conveyor 10 is substantially tangential to an endless conveyor or drum 14 for carrying the labels to such station. The labels are fed to the drum 14 from a hopper 15 through mechanism which comprises a pick-up and transfer mechanism 16 and a rotatable drum 17, the latter of which depicts the labels on the drum 14. The drums 14 and 17 are continuously rotating drums and hold the labels on their peripheral surfaces by means of suction exerted through apertures provided in the peripheral walls thereof in a manner well known to the art. In accordance with known practice, as each label is delivered by the drum 17 to a transfer station 18, the suction holding such label to the drum 17 is automatically discontinued and simultaneously suction is provided in a series of ports in the peripheral wall of the drum 14 moving through such transfer station 18. The suction emanating from such ports of the drum 14 immediately manifests itself to bring the released label firmly against the peripheral wall of the drum 14. The suction exerted through such ports retains the label firmly on the peripheral wall of the drum 14 throughout its travel from station 18 to the label applying station 12. During such travel of the label, it is rendered adhesive to enable the ready establishment of an adhesive contact between the same and a bottle 11 at the label applying station 12. In the machine shown, the label is rendered adhesive by applying a suitable adhesive material by a glue roll assembly 19 of known construction. As each adhesively coated label reaches the label applying station 12, it is brought into contact with and adhesively connected to a bottle passing through such station. The bottles with the labels affixed thereto then pass between a pressure pad 20 and a pressure belt 21 to press the labels firmly and in complete securement onto the surfaces of the bottles. The labeled bottles are then carried away from the labeling machine.

Figure 2:
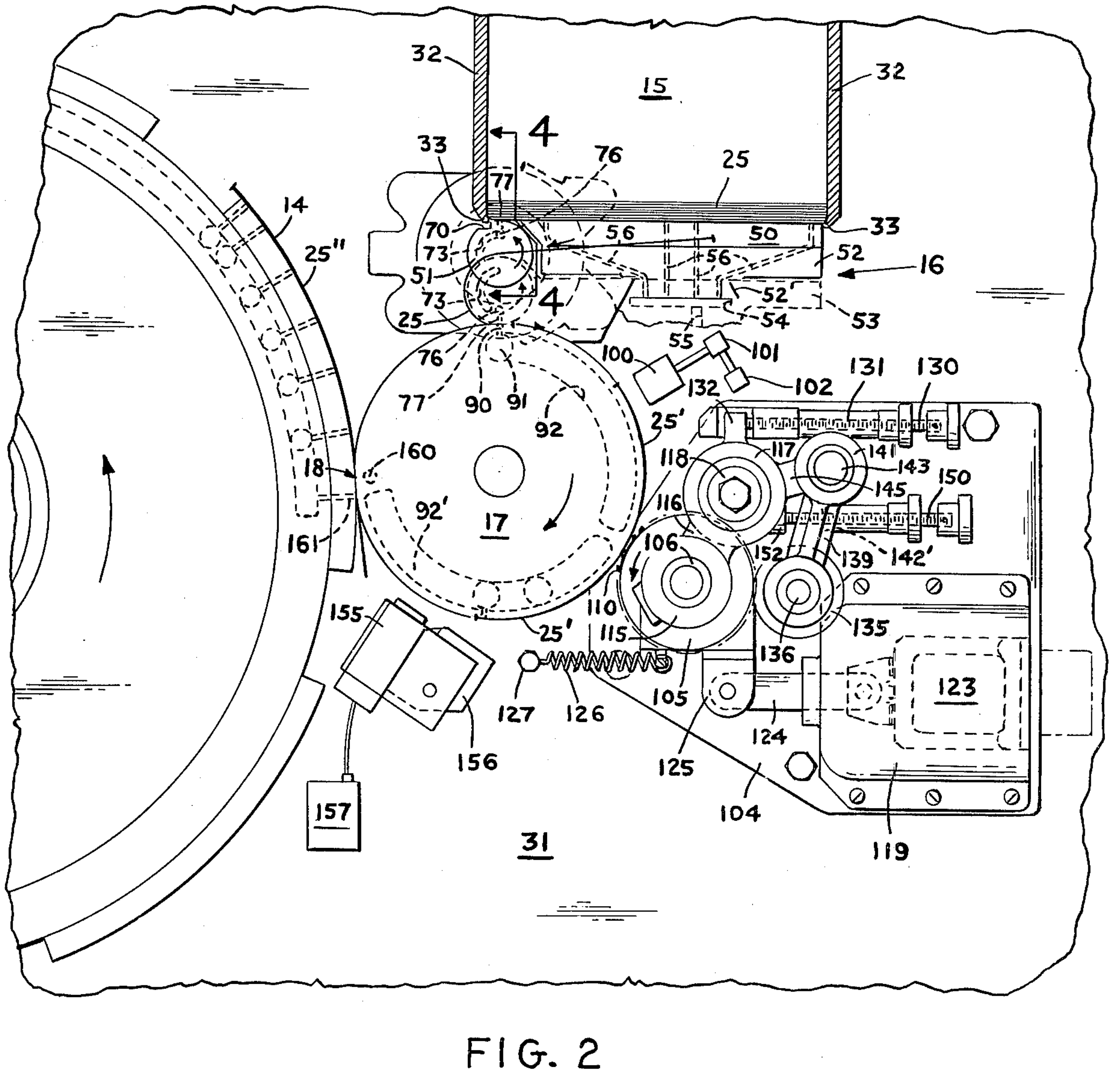
FIG. 2 is a partial diagrammatic plan view of the machine shown in FIG. 1 and showing in enlarged form the working end of the label transfer mechanism, the label feed drums and the printing mechanism.

As is shown in FIGS. 1 and 2 of the drawings, the label hopper 15 is a horizontal hopper in which the labels 25 are stacked vertically. The hopper 15 is located in back of the drum 17 with its front discharge end in closely spaced relation to such drum and extends rearwardly therefrom. As is shown more clearly in FIG. 3 of the drawings, the hopper 15 is a stationary hopper that is mounted on fixed supports 30 rising from the top of a table 31. In accordance with known construction, the hopper 15 is adjustable on the supports 30, and the label supporting members thereof are adjustable to receive labels of different sizes. The label guides 32 of the hopper are provided at their front ends with label retaining edges 33 (FIG. 2) typical with labeling machine hoppers. The successive front or terminal labels in the stack are maintained in engagement with such retaining edges by a pusher plate 34 as is usual.

Located below the hopper 15 is a horizontal slide 35 mounted for reciprocal sliding movement lengthwise of the hopper as indicated by the arrows designated 36. The slide is advanced forwardly by a cam roll 37 connected to its rear end and a horizontal cam 38 with which the cam roll is engaged. The cam 38 is mounted on a vertical shaft 39 that is rotatably mounted on the table 31 and is provided at its lower end with a gear 40 that is drivenly connected to the main drive of the labeler to rotate the cam 38 one revolution in each cycle of operation of the labeling machine. The slide 35 is retracted from its advanced position by a spring 41 connected at one end to such slide and connected at its other end to a fixed support 42 for the slide guide bar 43. The other end of the slide guide bar is carried by a like support 44; the two supports 42,44 being secured to the top of the table 31.

Figure 3:
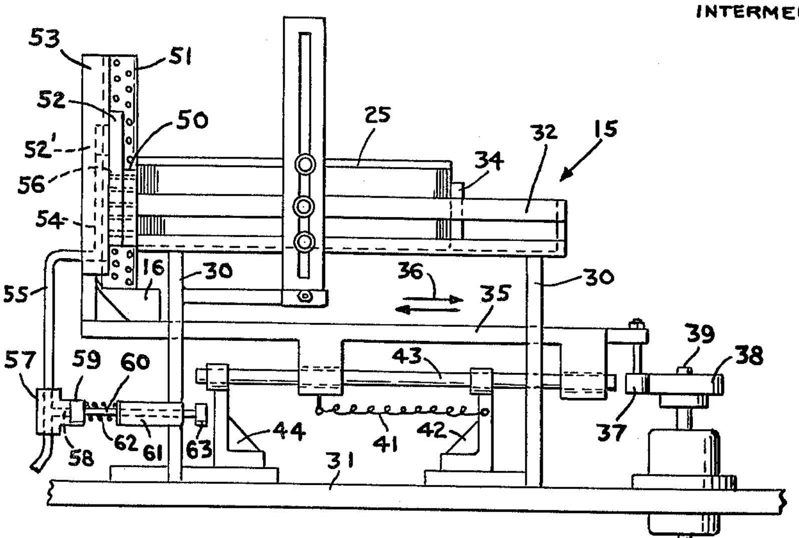
FIG. 3 is a diagrammatic side elevational view of the label hopper and the label transfer mechanism, the view looking at the right side of the hopper and transfer mechanism as shown in FIG. 1.

Mounted in upstanding relation on the forward end of the slide 35 is a label transfer mechanism 16, which comprises a vertically disposed transfer mouthpiece 50 and a transfer turret 51 arranged in side-by-side relation across the front of the hopper 15. The mouthpiece 50 contacts the major portion of the front or terminal label 25 in the stack thereof, but is slightly smaller than such label portion to enable it to move past the label retaining edges 33 as the mouthpiece enters into the front of the hopper 15 to contact the front label. The mouthpiece 50 is provided on a vertical plate 52 that is slidably keyed for vertical adjustment to the front of an upright plate 53. The plate 53 is provided with a recessed chamber 54 that is closed by the key 52′ of plate 52 and is connected by a conduit comprising a pipe 55 to a source of vacuum. Suction is provided at the rear label engaging surface of the mouthpiece 50 from the chamber 54 by aligned suction passageways 56 extending from such surface through the mouthpiece 50 and the plates 52 and 53 to such chamber. It will be understood that the suction at the rear label engaging surface of the mouthpiece 50 is not established until the vacuum system is closed by the engagement of such mouthpiece surface with the outer surface of the terminal label in the stack when the slide 35 is retracted, as shown in FIG. 3 and illustrated in full lines in FIG. 2 of the drawings. This suction is maintained during the initial part of the advancement of the slide 35 in withdrawing the mouthpiece 50 to cause the extraction of the front label from the hopper 15. While the slide 35 continues its advancing movement and consequently while the mouthpiece continues its withdrawing movement, and as soon as the label carried by the mouthpiece clears the hopper, means come into operation to break the vacuum in the mouthpiece. The means for accomplishing this purpose comprises a T-shaped fitting 57 incorporated in the vacuum line containing the pipe 55 which is fixedly connected to the plate 53. The fitting 57 provides an outlet port 58, which is closed by a stopper 59 as the mouthpiece 50 moves into engagement with a label in the hopper 15. The stopper 59 is mounted on the front end of a rod 60 slidably supported by a tubular guide 61 mounted on a fixed part of the machine, such as one of the hopper supporting legs 30. The stopper 59 is biased forwardly by a spring 62 mounted on the rod 60 between the stopper and the forward end of the guide 61. During such movement of the mouthpiece 50 into the hopper, the stopper 59 is moved rearwardly against the tension of spring 62. When the mouthpiece 50 withdraws from the hopper carrying a label the stopper is moved forwardly by the compressed spring. The forward movement of the stopper 59 is limited by a cap 63 mounted on the rear end of the rod 60 and engageable with the rear end of the guide 61 to stop such movement of the stopper. When this occurs the outlet port 58 is uncovered as the mouthpiece 50 continues its withdrawing movement, thereby breaking the vacuum to the mouthpiece and releasing the grip of the mouthpiece on the label being withdrawn from the hopper.

Figure 4:
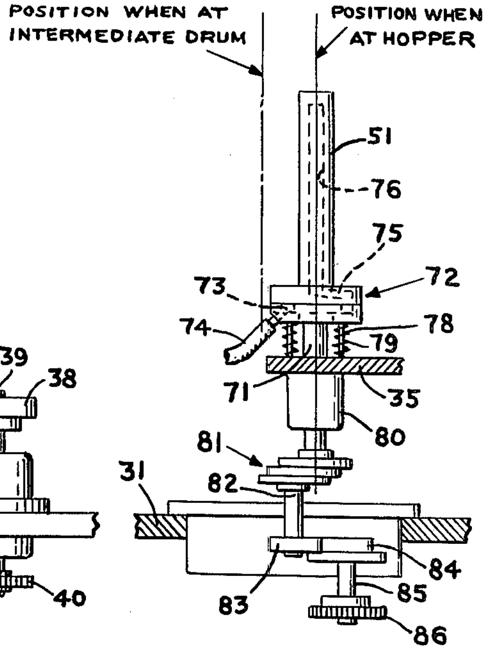
FIG. 4 is a diagrammatic side elevational view showing the means for operating the transfer turret of the label transfer mechanism, the view being taken substantially along the line 4—4 in FIG. 2.

The transfer turret 51 is an elongated cylindrical member of small diameter that comes into engagement with the terminal label in the hopper simultaneously with the mouthpiece 50, but only with that vertical edge of the label that is adjacently in back of the vacuum drum 17. The turret 51 is provided with a longitudinal slot 70 that enables it to clear the front end of the adjacent hopper label guide 32 as it enters the hopper 15 to engage the side edge of the terminal label. As shown in FIG. 4 of the drawings, the turret 51 is mounted on the upper end of an axially aligned, rotatable, vertical shaft 71. Located at the juncture of the turret 51 and the shaft 71 is a vacuum manifold 72 having an arcuately-shaped vacuum chamber 73 that is connected to a source of vacuum by a hose 74. The manifold 72 is mounted in stationary, but yieldable condition on the front end of the slide 35 by rods 78 and springs 79. In communication with the chamber 73 of the manifold is a passageway 75 which is in communication with the lower end of a vertical passageway 76 provided in the rotatable turret 51 (compare FIGS. 2 and 4). Branching out from the passageway 76 is a longitudinally extending series of short horizontal passageways 77 forming a vertical line of suction openings adjacent to the slot 70 for gripping an edge of the terminal label in the hopper.

Referring again to FIG. 4 of the drawings, the shaft 71 extends through and is supported by a vertical bearing 80 mounted in depending relation on the forward end of the slide 35. Connected to the lower end of shaft 71 is a variable offset drive coupling 81, such as the coupling of this type made by Schmidt Coupling, Inc. of Cincinnati, Ohio. The coupling 81 is capable of transmitting rotational movement to the shaft 71 while the latter is being shifted horizontally by the slide 35. The coupling 81 connects the shaft 71 to the output shaft 82 of an intermittently indexing drive mechanism mounted on the table 31 and of the type made by the Cyclo-Index Corporation of Cleveland, Ohio. This indexing mechanism comprises an output driven member 83 positively meshed in both acceleration and deceleration with an input driver member 84. The input member 84 is connected by a shaft 85 to a gear 86 which is connected to the main drive of the machine. The arrangement is such that in each revolution of the gear 86, the turret 51 is caused during one-half the revolution of the input member 84 to make a complete revolution during which the turret 51 is caused to accelerate from the stop position shown in full lines in FIG. 2, to a constant velocity equal to the velocity of the drum 17, and then to decelerate to a zero velocity, while the input member 84 completes its revolution.

With the foregoing description of the parts in mind, it will be understood that when the mouthpiece 50 and the turret 51 are moved into the front end of the hopper 15 by the retracting slide 35, the port 58 of the fitting member 57 will be closed by the stopper 59 and the passageway 76 will have moved into communication with one end of the arcuate vacuum chamber 73. The mouthpiece 50 and the turret 51 will be in the positions shown in FIG. 2 of the drawings ready to grip the terminal label 25 in the stack when they come into contact with the outer surface thereof. The labels 25 are stacked in the hopper 15 with their faces to the front so that they will be suctionally gripped on those surfaces which are not adhesively activated. The slide 35 is then moved forwardly to move both the mouthpiece 50 and the turret 51 out of the hopper 15 in a direction parallel to the axis of the hopper keeping the surfaces of the label being extracted parallel to the surfaces of the labels in the hopper. As the label clears the hopper the seal of the stopper 59 with the port 58 is broken, thereby breaking the vacuum in the mouthpiece 50 and releasing the extracted label from its grip. As the extracted label is released from the mouthpiece 50 and while the slide 35 continues its forward movement, the turret 51 which has retained its vacuum grip on the edge of the label will start to rotate in a counterclockwise direction, as indicated by the arrows in FIG. 2 of the drawings, and draw the label over the suction face of the mouthpiece 50. As the now rotating and translating drum with the edges of the label gripped thereby approaches tangency to the drum 17, as shown in dotted outline in FIG. 2, the peripheral surface speed of the turret 51 will have been accelerated to match the peripheral velocity of the intermediate drum 17. When the leading edge of the label attached to the transfer turret 51 is adjacent to the surface of the drum 17, the lower end of the vertical turret passageway 76 which has been traveling along the arcuate vacuum port 73 will pass beyond the end of the latter, thereby cutting off the vacuum supply to the turret. Simultaneously, rows of holes 90 in the surface of the drum 17 successively communicate through passageways 91 with one of the arcuate ports 92 provided in a fixed valve plate 93 (in FIG. 5) associated with said drum and connected to a vacuum source by conduits 94. A firm yet sliding contact is established between the bottom wall of the drum 17 and the fixed valve plate 93 by compression springs 95 mounted on guide pins 96 supporting the valve plate. Thus, as the label 25 is brought by the transfer turret 51 into contact with the peripheral surface of the drum 17 the rows of holes covered by the label exert a vacuum grip on the same to cause the label to be transferred from the turret 51 to the drum 17. As the surface velocities of the turret 51 and drum 17 are identical, the label literally rolls off the turret 51 and onto the drum 17. The transfer turret and mouthpiece will dwell in this position until the trailing end of the label has been advanced by the turret and drum 17 to the extent that it will not be caught between the turret and hopper as the turret and mouthpiece return to the fixed hopper to pick up another label. At this time, the transfer turret 51 will have rotated to the position shown in solid lines in FIG. 2 of the drawings, in position to enter the hopper and contact the terminal label therein.

While a label 25 is being so transferred to the drum 17 a previously transferred label 25' has been read by a label verifier 100 and is being imprinted by a printing device. Many labels, especially labels for containers of pharmaceutical products, are provided with control elements, such as a selected arrangement of bars, for making sure that the correct label is supplied to the container for a particular product. These control or verification elements are usually provided on the face side of the labels as the label indicia is being printed, or before the labels are supplied to the labeling machines. It is to be noted that while the labels are stacked in the label hopper with their faces outwardly, as is usual, as a result of the transfer action of the turret 51, the labels will be transferred to the drum 17 with their face sides outwardly. Further, there is in this machine an area between the station at which this transfer operation takes place and the printing device, through which the face sides of the labels are exposed in their travel to a sufficient extent to have verification readings made thereof and to accommodate a reading device for such purpose. In accordance with the invention, there is installed a laser beam device 100 of a known construction capable of reading bar code in hundreds of variations, such as the device manufactured by The Acu-Sort Company of Landsdale, Pa. When the labels being read by the device 100 bear the verification elements for which the device has been programmed, the machine continues in operation without disturbance. However, should a label being read by the device 100 have an incorrect verification control element, or no control element, the device 100 will signal appropriate means 101, to exercise a supervisory action on the labeling operation. This supervisory action may be exercised by causing the means 101 to actuate mechanism 102, such as bells or horns or switch means, to stop the operation of the label transfer mechanism, or to stop the machine, by methods known to the art.

The printing device is a completely assembled imprinter unit that can be added to a labeling machine when desired. All of the parts of which the imprinter is constituted are mounted on a plate 104 which is supported by and fastened to the table top 31 by a plurality of screws. The imprinter comprises a printing cylinder 105 adjustably mounted on a vertical shaft 106 connected by a gear 107 to the gear 108 for rotating drum 17 and driven by the latter. It will be noted in FIG. 5 of the drawings, that the table 31 is provided with a hole 31' which permits the lower end of shaft 106 and gear 107 to pass through the table when the imprinter unit was added to this labeling machine. The drum gear 108 meshes with the gear 109 which drives the drum 14. All three gears 107, 108 and 109 are connected for continuous rotation by suitable gearing to the main drive of the machine. The gears 107, 108 and 109 have diameters equal to the diameters of the printing cylinder, the drum 17 and the drum 14, respectively. The diameters of the gears 107 and 108 are such that the cylinder 105 makes one complete revolution for each label deposited on the drum 17 at a peripheral speed equal to the peripheral speed of the drum 17. In the embodiment shown, the cylinder 105 makes two revolutions during each revolution of the drum 17. The printing cylinder 105 may have any known construction for supporting printing type thereon and may be constructed to be supplied with a raised type printing matt 110, as shown. The type carried by the printing matt 110 is constructed to print on the labels control data such as batch numbers, dates, code numbers for controlling the distribution of the packaged product, or for providing a record of its distribution, etc.

Figure 5:
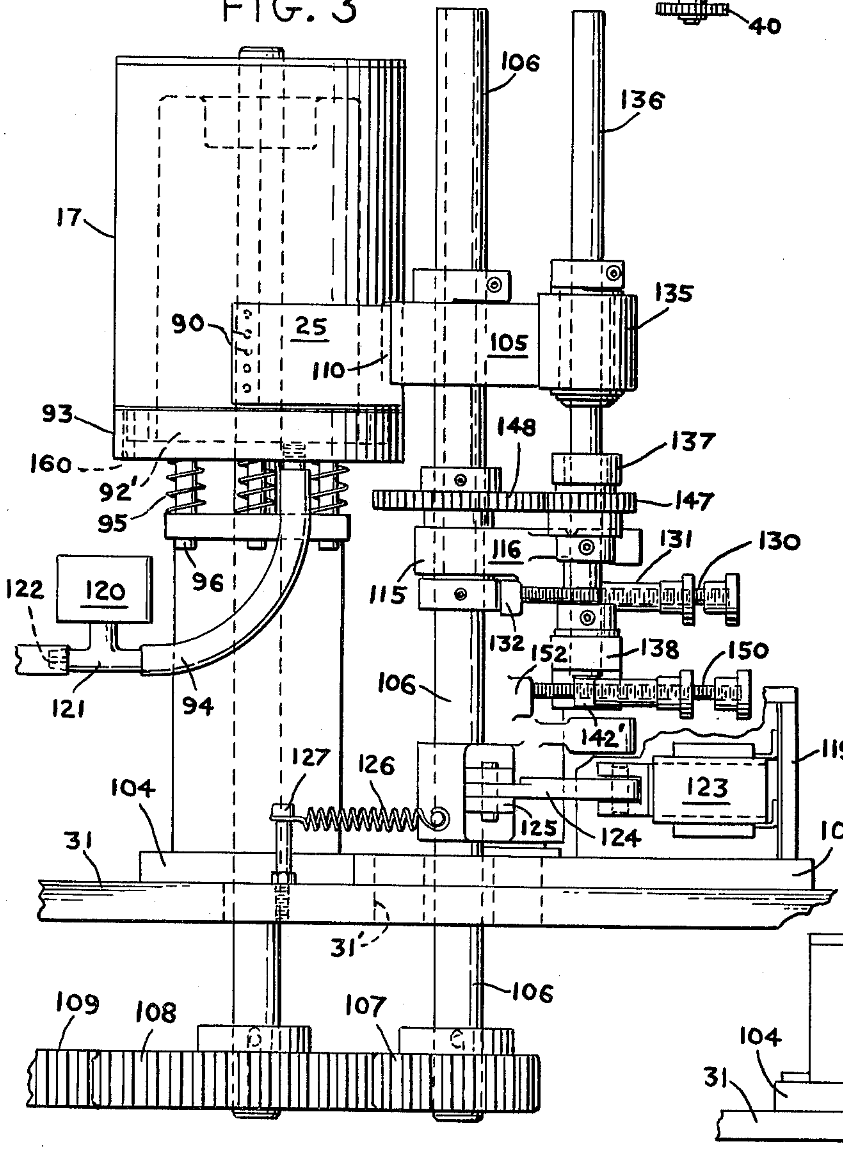
FIG. 5 is a diagrammatic front elevational view of the printing mechanism and associated drum shown in FIG. 2 of the drawings.
Figure 6:
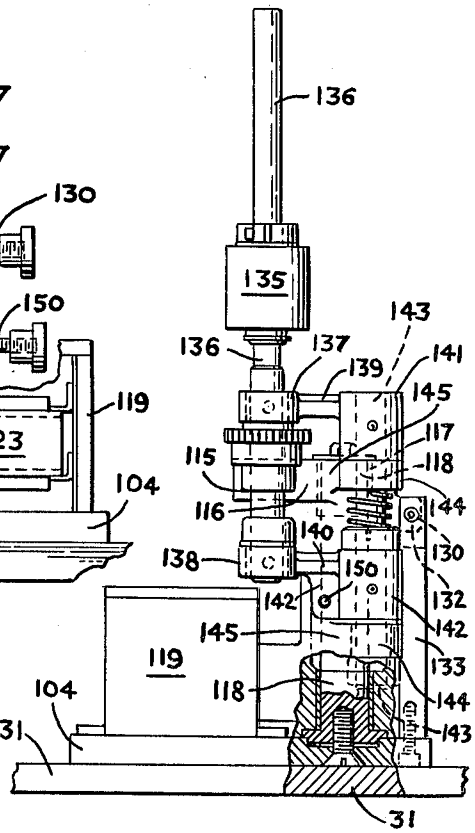
FIG. 6 is a diagrammatic side elevational view of the printing mechanism, the view looking at the right of such mechanism, as shown in FIG. 2.

Referring now to FIGS. 3, 5 and 6, it will be observed that the shaft 106 and consequently the printing cylinder 105 and gear 107, are carried by a boss 115 provided on one end of a lever 116. The other end of the lever 116 is in the form of a sleeve 117 which is connected to a vertical shaft 118 mounted for pivotal movement on the imprinter mounting plate 104. The shaft 118 thereby functions as a pivot for movement of the printing cylinder 105 toward and away from the peripheral surface of the drum 17 to prevent the application of ink by the printing matt 110 in the absence of a label and to control the intensity of the imprint made by the matt 110 on a label. The operableness of the printing cylinder to apply ink is controlled by the presence, or lack of presence of a label on the drum 17. If a label is being carried by the drum 17 through the printing station, such as the label 25' shown in FIG. 2 of the drawings, a vacuum operated electric switch 120 connected in the conduit line 94 leading from the vacuum port 92 in the drum 17 to the vacuum pump will not disturb the printing operability of the cylinder 105 which is in the printing position shown in FIG. 2 of the drawings. The switch 120 is of a type known to the art such as the Barksdale Company's "Meletron" vacuum operated electric switch. The switch is in an open position, as shown in FIG. 5, when there is vacuum in the line because of the presence of a label on the drum 17. When the vacuum in the line is broken because there is no label on the drum 17 to be printed, the switch 120 will close. The closure of the switch 120 is caused to occur within the interval of time it takes the leading edge of a label to travel from its place of attachment to the drum 17 by the transfer turret 51 to the forward end of the vacuum port 92, which is at the printing station. If there is not a label on the drum in such interval a device 121 in the conduit line 94 and to which the switch 120 is connected will cause an immediate drop in the vacuum at such place, thereby closing the switch. The device 121 comprises a T-shaped member formed to provide an orifice 122 in the vacuum line 94 which creates a restriction to air flow between the vacuum pump and switch 120. Thus, when a label 25 is not fed to the drum 17 for printing by the cylinder 105, the holes 90 in drum 17 will be exposed to air. The air comes in faster then the restricted entrance 122 of the T-shaped member of device 121 will take it away. Accordingly, vacuum will disappear in the device 121 and cause the switch 120 to close. The switch 120 is electrically connected to a pull type solenoid 123 contained in an electrically insulated box 119 mounted on and secured to the imprinter mounting plate 104. The solenoid core is connected by a link 124 to the outer end of a lever 125 secured to the shaft 106. Also connected to the lever 125 is one end of a spring 126, the other end of which is connected to a belt 127 secured to the table top 31. The spring 126 is positioned to bias the lever 125 and consequently the shaft 106 to bring the printing matt 110 into engagement with the face side of the label 25' on the drum 17 when the solenoid 123 is inoperative. The solenoid 123 is located to pull the lever 125 toward it when activated by the switch 120 against the tension of the spring 126. When the solenoid 123 is so activated, the shaft 106 is moved out sufficiently to prevent the printing matt 110 engaging the peripheral surface of the drum 17. Consequently, when there is no label on the drum 17 to be printed, the cylinder 105 will be rendered incapable of applying ink to the peripheral surface of the drum. The movement of the core in the solenoid 123, when the latter is energized, is quite small—of the order of 1/16". Because of the connection of such core with the shaft 106, the resulting translation or shift of the shaft 106 with relation to the drum 17 is approximately 1/32". The gear teeth in the gear 107 are specially designed to permit a movement of such extent by such gear with relation to the drum gear 108 without effecting the motion transmitted by gear 108 to gear 107.

The degree of contact of the printing matt 110 with the face of the label in the printing operation may be adjusted by the manipulation of an adjustment screw 130 extending through an internally threaded sleeve 131 attached to a vertically standing notched block mounted on and fastened to the imprinter mounting plate 104. The inner end of the adjustment screw 130 engages an abutment 132 provided on the sleeve 117. The abutment 132 is maintained in engagement with the end of the adjustment screw 130 by the spring 126. When such an adjustment is made the sleeve will be rotated to move the printing cylinder 105 about the axis of the shaft 118.

The printing matt 110 is inked by what is known in the trade as an ink fountain roll 135 which comprises a porous roll of synthetic material impregnated with the ink to be used. As shown more clearly in FIGS. 5 and 6, the ink roll 135 is adjustably mounted on the upper end of a vertical shaft 136 supported for rotational movement by bearings 137, 138 provided on the outer ends of levers 139 and 140, respectively. Rotational movement is imparted to shaft 136 by a gear 147 secured to such shaft and in mesh with a gear 148 secured to shaft 106. It will be noted that gears 147 and 148 have diameters equal to the diameters of the ink roll 135 and the printing cylinder 105, respectively. Accordingly, the peripheral speed of the ink roll 135 is equal to that of the printing cylinder 105. The end bosses or sleeves 141 or 142 on the other ends of the levers 139, 140, respectively, are secured to a vertical shaft 143 rotatably supported by the bearings 144, 144 provided on the outer ends of the vertically spaced levers 145 attached at their other ends to sleeve 117. It will thus be seen that when any adjustment is made of the printing cylinder 105 about the axis of shaft 118 to change its position with relation to the drum 17, the shaft 143, shaft 136 and ink roll 135 will be likewise shifted about the axis of shaft 118 so that the entire inking mechanism moves as a unit about such axis without changing the relation of the printing cylinder 105 and the inking roll 135. Such relation, however, may be changed by manipulation of an adjustment screw 150 extending through an internal thread provided in a boss 142', on the lever 140 and engaging an abutment 152 provided on the sleeve 117 of lever 116. This adjustment changes the degree of contact of the ink fountain roll 135 with the printing matt 110 to obtain the desired intensity of the print made on the labels. Once such adjustment is made it does not vary with any shifting that may be made of the printing mechanism about the axis of shaft 118.

As will be observed in FIG. 2 of the drawings, there is a substantial space through which the face of the label will be exposed in its travel from the printing cylinder 105 to the drum 14. There is installed in such space a device 155 capable of detecting the control data which has been imprinted on the face of the label by the printing cylinder 105. The device 155 is a known electronic scanning device of the type whose circuitry includes a selector switch which at timed intervals instructs the scanning eye to look for the data which has been imprinted on the label 25'. The detector 155 is adjustably mounted on a stand 156 to locate the scanning eye thereof on the same level as that of the imprint. When properly adjusted the detector 155 will intermittently operate to detect each imprint on each label as the labels pass through its field of detection. When the labels bear an imprint in the area in which an imprint should have been made, the machine continues in operation without disturbance. When, however, the device 155 does not detect an imprint in the area it should appear, there will be created in the device a signal to exercise a supervisory action. This supervisory action may be exercised as in the case of the verifier 100, by causing the signal to actuate mechanism 157 such as bells or horns, or switch means to stop the operation of the label transfer mechanism, or to stop the machine.

After a label has passed the data detector 155 it arrives at the transfer station 18 where it is discharged from the drum 17 onto the drum 14. It will be noted in FIG. 2 of the drawings that the vacuum port 92' terminates just short of station 18 and that at such station the valve plate 93 is provided with a hole 160 to the atmosphere. At this time therefore, as there is no suction being exercised on the leading edge of the label, which is now under atmospheric pressure, it is no longer being gripped by the drum 17, but it becomes immediately gripped by the suction provided by the vacuum holes 161 in the drum 14. The holes 161 are provided with vacuum in a manner known to the art as the label arrives at station 18. As the gears 108 and 109 which drive the drums 17 and 14, respectively are each of the same diameter as its associated drum, as has been previously explained, the peripheral speeds of the drum 17 and the drum 14 are equal so that the label will smoothly roll off the drum 17 onto the drum 14. In FIG. 2 of the drawings, the illustrated label 25'' shows how this transfer takes place. It is to be noted, that while a label is on the drum 17, it will be faced outwardly, as illustrated by the label 25', to enable the verifying, printing and detecting operations to be made on such label face. However, when the label is transferred to the drum 14 as demonstrated by the label 25'', its back side will be outwardly disposed. Accordingly, when the label in its travel with the drum 14 passes the glue roll assembly 19 it will have adhered to its back side a coating of adhesive material. As previously explained when the adhesive coated label is delivered by the drum 14 to the label applying station 12, it is transferred to an article arriving at such station.

While I have illustrated in the accompanying drawings and hereinabove described a preferred embodiment of my invention, it will be apparent to those skilled in the art that various changes may be made in the apparatus without departing from the spirit of the invention or the scope of the appended claims.

We claim:

1. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed equal to the peripheral speed of said first drum, means normally supporting said printing cylinder with said first axis stationarily located to maintain said printing cylinder in operative printing position relative to said first drum during the rotative movements of said drum and operable to move said printing cylinder by a translatory movement relative to said first drum about a second axis, operable means connected to said supporting means for moving the latter about said second axis to shift said printing cylinder from an operative printing position to a withdrawn inoperative printing position and vice versa, and vacuum operated means operatively connected to the suction means of said first drum and to said operable means, and operable when a label is not carried by said first drum for a printing operation by said printing cylinder to actuate said operable means to withdraw said printing cylinder.

2. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed equal to the peripheral speed of said first drum, means supporting said printing cylinder for translatory movement relative to said first drum about a second axis, operable means connected to said supporting means for moving the latter about said second axis to shift said printing cylinder from an operative printing position to a withdrawn inoperative printing position and vice versa, vacuum operated means operatively connected to the suction means of said first drum and to said operable means, and operable when a label is not carried by said first drum for a printing operation by said printing cylinder to actuate said operable means to withdraw said printing cylinder, a shaft rotatably supporting said printing cylinder and the longitudinal axis of which constitutes said first axis, a driven gear on said shaft for imparting rotational movement thereto, a driving gear in mesh with said driven gear, said gears being constructed to permit a slight translational movement of said shaft without disruption of the rotational connection of said driven and driving gears, and in which said operative means includes means connected to said shaft for yieldably maintaining said shaft in a position in which said printing cylinder thereon is in operative printing position relative to said first drum, and positive actuating means connected to said shaft and to said vacuum operated means and controlled by the latter to permit said yieldable means to maintain such operative printing position of the printing cylinder while labels are being successively carried by said first drum for a printing operation and to overcome said yieldable means and by a translatory movement shift said shaft and printing cylinder about said second axis to bring said printing cylinder to a withdrawn inoperative position when a label is not carried by a drum for said printing operation.

3. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed ewual to the peripheral speed of said first drum, means supporting said printing cylinder for translatory movement relative to said first drum about a second axis, operable means connected to said supporting means for moving the latter about said second axis to shift said printing cylinder from an operative printing position to a withdrawn inoperative printing position and vice versa, vacuum operated means operatively connected to the suction means of said first drum and to said operable means, and operable when a label is not carried by said first drum for a printing operation by said printing cylinder to actuate said operable means to withdraw said printing cylinder, a first shaft rotatably supporting said printing cylinder and the longitudinal axis of which constitutes said first axis, and said supporting means comprising a second shaft spaced from said first shaft and the central axis of which constitutes said second axis, and means mounted on said second shaft and supporting said first shaft and said printing cylinder for pivotal movement about the axis of said second shaft, said means mounted on said second shaft including an abutment, an adjusting member mounted on a fixed part of the machine and engageable with a surface of said abutment to radially adjust with respect to said second axis said supporting means and said printing cylinder, and thereby to adjust said printing cylinder with respect to said first drum, said operable means maintaining said abutment in operative relation to said adjusting member.

4. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed equal to the peripheral speed of said first drum, means supporting said printing cylinder for translatory movement relative to said first drum about a second axis, operable means connected to said supporting means for moving the latter about said second axis to shift said printing cylinder from an operative printing position to a withdrawn inoperative printing position and vice versa, vacuum operated means operatively connected to the suction means of said first drum and to said operable means, and operable when a label is not carried by said first drum for a printing operation by said printing cylinder to actuate said operable means to withdraw said printing cylinder, a first shaft rotatably supporting said printing cylinder and the longitudinal axis of which constitutes said first axis, and said supporting means comprising a second shaft spaced from said first shaft and the central axis of which constitutes said second axis, and means mounted on said second shaft and supporting said first shaft and said printing cylinder for pivotal movement about the axis of said second shaft, an ink applying roll in given peripheral engagement with said printing cylinder and means mounted on said second shaft and supporting said ink applying roll for pivotal movement with said printing cylinder as a unit about the axis of said second shaft without disturbing the aforesaid peripheral engagement therebetween.

5. In a labeling machine as defined in claim 4, in which said ink roll supporting means mounted on said second shaft comprises a third shaft rotatably supporting said ink roll, a fourth shaft located between said second and third shafts, means mounted on said fourth shaft supporting said third shaft and said printing roll for pivotal movement about the axis of said fourth shaft, a first adjusting member fixed on said third shaft supporting means, a second adjusting member coactable with said first adjusting member and operatively engageable with a second abutment provided on said means mounted on said second shaft to radially adjust with respect to said fourth axis said third shaft supporting means and said ink roll and thereby to adjust said ink roll with respect to said printing cylinder, said first, third and fourth shafts being shiftable as a unit about said second axis.

6. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed equal to the peripheral speed of said first drum, means supporting said printing cylinder for translatory movement relative to said first drum about a second axis, operable means connected to said supporting means for moving the latter about said second axis to shift said printing cylinder from an operative printing position to a withdrawn inoperative printing position and vice versa, vacuum operated means operatively connected to the suction means of said first drum and to said operable means, and operable when a label is not carried by said first drum for a printing operation by said printing cylinder to actuate said operable means to withdraw said printing cylinder, said label supplying means comprising a transfer mouthpiece and a rotatable turret provided with suction means to enable them to exert a suction grip on the portions of a separate label engaged thereby, means for reciprocating said mouthpiece and said turret as a whole between a first position in which said turret engages an edge of the back side of the terminal label in a relatively stationary label magazine and said mouthpiece simultaneously engages a major portion of such label backside, and a second position in which the peripheral surface of said turret is adjacent to the peripheral surface of said first drum, said mouthpiece and said turret during said translatory movement withdrawing the terminal label from the label magazine, means for breaking the suction in said mouthpiece to release its grip on the terminal label as the latter clears the label magazine, and means for rotating said turret after the release of the label from the grip of said mouthpiece and during its translating movement, from zero peripheral speed at said first position to a peripheral speed at said second position to enable said turret to roll a gripped label on said first drum with the face side of the label delivered to said first drum turned outwardly, said suction means being operative to release the label at said second position, and said rotating means ceasing its drive of said turret when the label is delivered to said first drum.

7. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed equal to the peripheral speed of said first drum, means supporting said printing cylinder for translatory movement relative to said first drum about a second axis, operable means connected to said supporting means for moving the latter about said second axis to shift said printing cylinder from an operative printing position to a withdrawn inoperative printing position and vice versa, vacuum operated means operatively connected to the suction means of said first drum and to said operable means, and operable when a label is not carried by said first drum for a printing operation by said printing cylinder to actuate said operable means to withdraw said printing cylinder, means located between said label supplying means and said printing means for inspecting the face sides of labels while such labels are being carried by said first drum to said printing cylinder, and means selectively controlled by said inspecting means and operative by the latter whenever an inspected label does not pass such inspection, to exercise a supervisory action on the labeling operation.

8. In a labeling machine a first continuously rotatable drum provided with suction means to enable it to carry separate labels on its peripheral surface, means for supplying separate labels in given succession to said drum with the face sides of such labels turned outwardly, a second continuously rotatable drum rotating in the opposite direction at a peripheral speed equal to that of said first drum, said second drum being positioned adjacent to said first drum and provided with suction means to receive the labels from said first drum and to retain the labels on its peripheral surface with their back sides outermost while being adhesively activated, and printing means adjacent to said first drum and positioned in circumferentially spaced relation between said label supply means and said second drum for printing indicia on the face sides of the labels carried by said first drum, said printing means comprising a printing cylinder mounted for rotation about a first axis at a peripheral speed equal to the peripheral speed of said first drum, means supporting said printing cylinder for translatory movement relative to said first drum about a second axis, operable means connected to said supporting means for moving the latter about said second axis to shift said printing cylinder from an operative printing position to a withdrawn inoperative printing position and vice versa, vacuum operated means operatively connected to the suction means of said first drum and to said operable means, and operable when a label is not carried by said first drum for a printing operation by said printing cylinder to actuate said operable means to withdraw said printing cylinder, means located between said printing means and said second drum for inspecting the face sides of labels while such labels are being carried by said first drum from said printing cylinder to said second drum, and means selectively controlled by said inspecting means and operative by the latter whenever an inspected label does not include an imprint by said printing cylinder, to exercise a supervisory action on the labeling operation.

9. A unitary imprinter for a labeling machine having a continuously rotatable drum provided with suction means to enable it to carry separate labels on its peripheral surface, and means for successively feeding to said drum separate labels with the face sides thereof turned outwardly, said unitary imprinter comprising a mounting plate adapted to be fastened to the labeling machine, a first shaft mounted on said plate for rotatable movement about a first axis, a second shaft, first support means supporting said second shaft on said first shaft for translatory movement about said first axis and for rotational movement about its own axis, a printing cylinder mounted on said second shaft, a first gear and a second gear mounted on said second shaft, said first gear being adapted to be driven to rotate said printing cylinder and said second shaft about the latter's axis, a third shaft, second support means supporting said third shaft on said first shaft for translatory movement about said first axis with said second shaft as a unit and for rotational movement about is own axis, an ink roll mounted on said third shaft and operatively related to said printing cylinder, a third gear mounted on said third shaft and meshed in driven relation with the second gear on said second shaft, and control means mounted on said mounting plate for normally maintaining said operatively related printing cylinder and ink roll as a unit in operative printing position and operative to withdraw said printing cylinder and ink roll as a unit about said first axis to an inoperative printing position.

10. A unitary imprinter as defined in claim 9, including an abutment member secured to said first shaft, and adjusting means mounted on said mounting plate and comprising an adjustable member engageable with said abutment member and operative through its engagement with the latter to turn said first support means about said first axis to adjust said printing cylinder and ink roll as a unit relative to said drum.

11. A unitary imprinter as defined in claim 9, in which said second support means includes a fourth shaft, third support means supporting said fourth shaft on said first shaft in fixed parallel relation to said second shaft, fourth support means rotatably supporting said third shaft on said fourth shaft, an abutment member secured to said first shaft, adjusting means secured to said third support means and comprising an adjustable member engageable with said abutment member and operative through its engagement with the latter to turn said third shaft about the axis of said fourth shaft to adjust the relation of said printing cylinder and ink roll.

* * * * *